US010458346B2

United States Patent
Barta et al.

(10) Patent No.: US 10,458,346 B2
(45) Date of Patent: Oct. 29, 2019

(54) COMBUSTION PRESSURE FEEDBACK BASED ENGINE CONTROL WITH VARIABLE RESOLUTION SAMPLING WINDOWS

(71) Applicant: WOODWARD, INC., Fort Collins, CO (US)

(72) Inventors: Jason Barta, Fort Collins, CO (US); Gregory James Hampson, Boulder, CO (US); Jeffrey Carlson, Denver, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 15/968,447

(22) Filed: May 1, 2018

(65) Prior Publication Data

US 2018/0245527 A1    Aug. 30, 2018

Related U.S. Application Data

(62) Division of application No. 15/099,486, filed on Apr. 14, 2016, now Pat. No. 10,012,155.
(Continued)

(51) Int. Cl.
*F02D 35/02* (2006.01)
*F02D 41/00* (2006.01)
(Continued)

(52) U.S. Cl.
CPC ....... *F02D 35/023* (2013.01); *F02D 41/0025* (2013.01); *F02D 41/0027* (2013.01);
(Continued)

(58) Field of Classification Search
CPC .. F02D 35/023; F02D 35/028; F02D 41/0027; F02D 41/0025; F02D 41/401; Y02T 10/36
See application file for complete search history.

(56) References Cited

U.S. PATENT DOCUMENTS 4,494,509 A    1/1985 Long
4,736,724 A    4/1988 Hamburg et al.
(Continued)

FOREIGN PATENT DOCUMENTS

EP    0221673 A2    5/1987
EP    1905989 A2    4/2008
(Continued)

OTHER PUBLICATIONS

AVAT Automation GMBH, "E² Precon, the Cylinder Pressure Based Engine Controller Combines Efficiency with Performance," published on or before Oct. 2013, 2 pages. http://www.avat.de/en/engine-control-systems-esc/products/e2precon.html.
(Continued)

*Primary Examiner* — Carl C Staubach
(74) *Attorney, Agent, or Firm* — Fish & Richardson P.C.

(57) ABSTRACT

A system for controlling an internal combustion engine has an in-cylinder pressure sensor, a crank angle sensor and a controller coupled to receive inputs from the pressure sensor and crank angle sensor. The controller is configured to convert the cylinder pressure input into a combustion metric indicative of the combustion occurring in the measured cylinder and control fuel input and timing into the engine based on the combustion metric. The controller samples the in-cylinder pressure sensor at a high frequency during critical combustion events and at a lower frequency during the non-critical cylinder conditions.

15 Claims, 5 Drawing Sheets

Related U.S. Application Data

(60) Provisional application No. 62/147,405, filed on Apr. 14, 2015.

(51) Int. Cl.
  *F02D 41/14* (2006.01)
  *F02D 41/26* (2006.01)
  *F02P 5/152* (2006.01)
  *F02D 41/28* (2006.01)

(52) U.S. Cl.
  CPC ............. *F02D 41/14* (2013.01); *F02D 41/26* (2013.01); *F02P 5/152* (2013.01); *F02D 2041/286* (2013.01); *F02D 2250/12* (2013.01); *F02D 2250/14* (2013.01); *Y02T 10/36* (2013.01)

(56) References Cited

U.S. PATENT DOCUMENTS

| | | |
|---|---|---|
| 4,944,271 A | 7/1990 | Iwata et al. |
| 5,156,126 A | 10/1992 | Ohkubo et al. |
| 5,715,794 A | 2/1998 | Nakamura |
| 5,765,530 A | 6/1998 | Machida |
| 5,765,532 A | 6/1998 | Zur Loye |
| 5,831,263 A | 11/1998 | Komachiya |
| 5,878,717 A | 3/1999 | Zur Loye |
| 6,142,119 A | 11/2000 | Abe |
| 6,273,076 B1 | 8/2001 | Beck |
| 6,354,268 B1 | 3/2002 | Beck et al. |
| 6,474,323 B1 | 11/2002 | Beck |
| 6,484,694 B2 | 11/2002 | Thomas |
| 6,553,305 B2 | 4/2003 | Dixon et al. |
| 6,560,526 B1 | 5/2003 | Matekunas |
| 6,561,157 B2 | 5/2003 | Zur Loye |
| 6,598,468 B2 | 7/2003 | Zur Loye |
| 6,684,849 B2 | 2/2004 | Zur Loye |
| 6,711,945 B2 | 3/2004 | Fuerhapter |
| 6,810,320 B2 | 10/2004 | Yamamoto et al. |
| 6,840,218 B2 | 1/2005 | Scholl |
| 6,907,870 B2 | 6/2005 | zur Loye et al. |
| 6,915,776 B2 | 7/2005 | Zur Loye |
| 7,062,955 B2 | 6/2006 | Kashiwase |
| 7,150,262 B2 | 12/2006 | Demura |
| 7,155,334 B1 | 12/2006 | Stewart |
| 7,231,906 B1 | 6/2007 | Haskara |
| 7,246,597 B2 | 7/2007 | Kuo |
| 7,299,680 B2 | 11/2007 | Okubo |
| 7,367,318 B2 | 5/2008 | Moriya |
| 7,467,614 B2 | 12/2008 | Stewart et al. |
| 7,506,535 B2 | 3/2009 | Kang |
| 7,506,536 B2 | 3/2009 | Cornwell |
| 7,509,932 B2 | 3/2009 | Hara |
| 7,549,414 B2 | 6/2009 | Moriya |
| 7,606,650 B2 | 10/2009 | Mizuno |
| 7,606,655 B2 | 10/2009 | Husted et al. |
| 7,669,583 B2 | 3/2010 | Moriya |
| 7,673,618 B2 | 3/2010 | Hasegawa |
| 7,693,646 B2 | 4/2010 | Moriya |
| 7,735,478 B1 | 6/2010 | Dagci |
| 7,806,100 B2 | 10/2010 | Schnorbus |
| 7,822,529 B2 | 10/2010 | Dagci et al. |
| 7,861,690 B2 | 1/2011 | Moriya |
| 7,870,844 B2 | 1/2011 | Moriya |
| 7,899,601 B2 | 3/2011 | Yun |
| 7,921,699 B2 | 4/2011 | Hoshi |
| 7,930,929 B2 | 4/2011 | Galtier |
| 7,957,889 B2 | 6/2011 | Portin |
| 8,046,156 B2 | 10/2011 | Moriya |
| 8,051,836 B2 | 11/2011 | Moriya |
| 8,068,972 B2 | 11/2011 | Auclair |
| 8,150,602 B2 | 4/2012 | Anilkumar |
| 8,161,944 B2 | 4/2012 | Moriya |
| 8,229,648 B2 | 7/2012 | Kang |
| 8,260,531 B2 | 9/2012 | Yasuda |
| 8,301,356 B2 | 10/2012 | Wang |
| 8,408,191 B2 | 4/2013 | Sellnau |
| 8,413,495 B2 | 4/2013 | Higuchi |
| 8,596,242 B2 | 12/2013 | Nada |
| 8,600,644 B2 | 12/2013 | Verner |
| 8,645,044 B2 | 2/2014 | Wermuth |
| 8,651,088 B2 | 2/2014 | Urano |
| 8,677,975 B2 | 3/2014 | Auclair |
| 8,744,733 B2 | 6/2014 | Sano |
| 8,826,884 B2 | 9/2014 | Kang et al. |
| 8,831,856 B2 | 9/2014 | Yasuda |
| 8,843,295 B2 | 9/2014 | Santoso |
| 8,910,615 B2 | 12/2014 | Suzuki |
| 9,010,303 B2 | 4/2015 | Moonjelly |
| 9,316,169 B2 | 4/2016 | Barth |
| 9,371,789 B2 | 6/2016 | Rosswurm |
| 2002/0007816 A1 | 1/2002 | Zur Loye |
| 2005/0229903 A1 | 10/2005 | Kobayashi |
| 2006/0185631 A1 | 8/2006 | Fitzgerald |
| 2007/0119417 A1 | 5/2007 | Eng |
| 2008/0082250 A1 | 4/2008 | Husted |
| 2008/0133108 A1 | 6/2008 | Kojinna et al. |
| 2009/0281708 A1 | 11/2009 | Loeffler et al. |
| 2010/0065016 A1 | 3/2010 | Bromberg |
| 2010/0305829 A1 | 12/2010 | Santoso |
| 2012/0103304 A1 | 5/2012 | Kang et al. |
| 2013/0042843 A1 | 2/2013 | Sano |
| 2013/0103283 A1 | 4/2013 | Malaczynski |
| 2013/0179052 A1 | 7/2013 | Kawakami |
| 2014/0053811 A1 | 2/2014 | De Ojeda et al. |
| 2014/0373822 A1 | 12/2014 | Rosswurm et al. |
| 2015/0094939 A1 | 4/2015 | D'Amato |
| 2015/0315993 A1 | 11/2015 | Nagai |
| 2015/0377166 A1 | 12/2015 | Yasuda |
| 2016/0017834 A1 | 1/2016 | Yun |
| 2016/0069287 A1 | 3/2016 | Lavertu |

FOREIGN PATENT DOCUMENTS

| | | |
|---|---|---|
| EP | 1930571 A2 | 6/2008 |
| EP | 1953368 A2 | 8/2008 |
| EP | 2708722 A1 | 3/2014 |
| GB | 2471890 A | 1/2011 |
| JP | 2000170589 | 6/2000 |

OTHER PUBLICATIONS

Barta et al., "Practical Cylinder Pressure Monitoring for Production IC Engines Combustion Control Using Real-Time Combustion Diagnostics and Control (RT-CDC) Module," 9th Dessau Gas Engine Conference, Copyright 2014, 5 pages.

Cremers, "Beginnings for Cylinder Pressure Based Control," published in 2007, 116 pages.

PCT International Search Report and Written Opinion of the International Searching Authority, PCT US/2016/027622, dated Jul. 21, 2016, 15 pages.

Punater et al., "Controller for Rapid Development of Advanced Mode Combustion Algorithms using Cylinder Pressure Feedback," Oct. 20, 2008, 2 pages.

Japanese Office Action in Japanese Application No. 2017-554025, dated Jul. 19, 2019, 12 pages with english translation.

PCT International Preliminary Report on Patentability in International Application No. PCT/US2016/027622, dated Oct. 26, 2017, 11 pages.

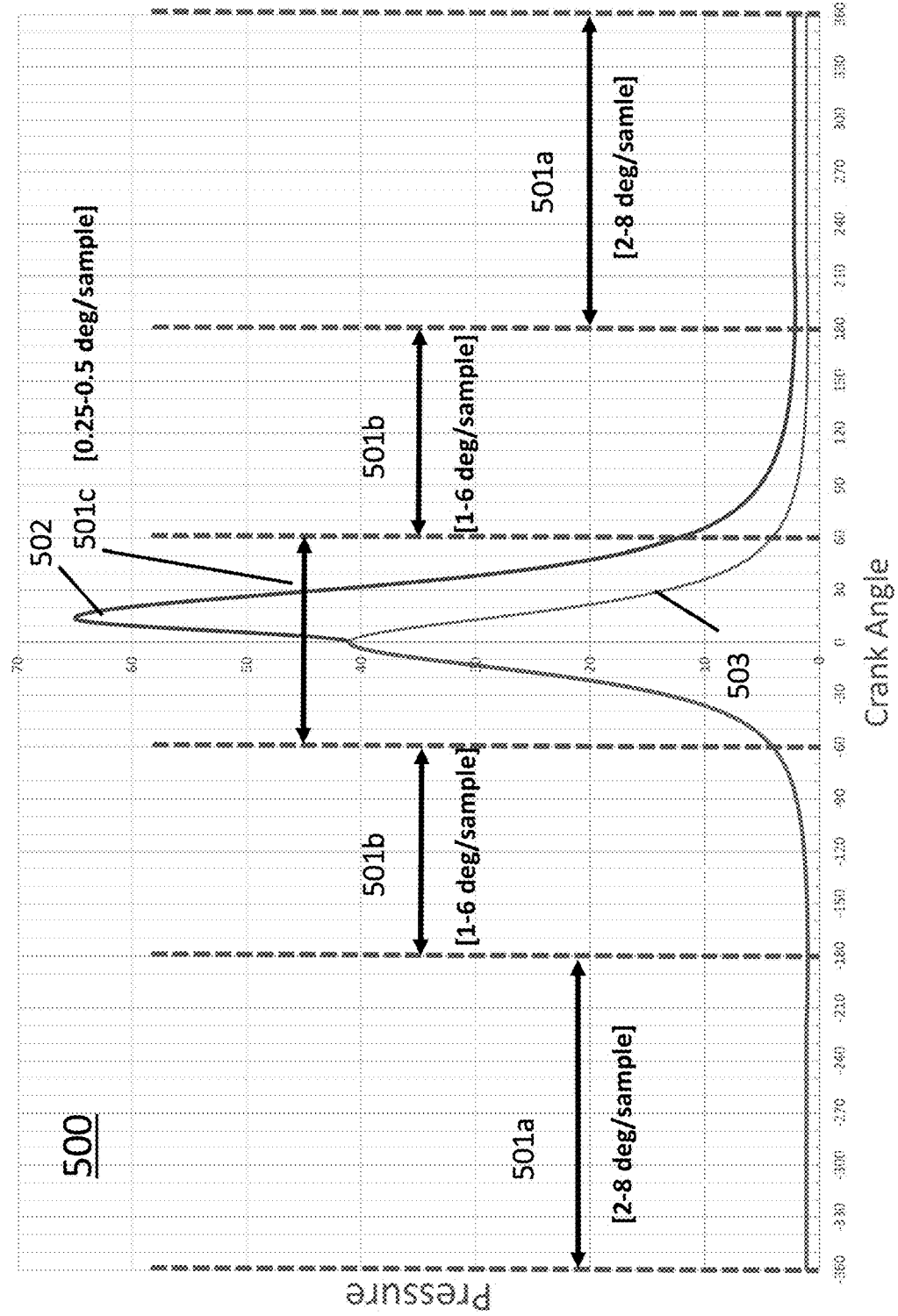

COMBUSTION PRESSURE FEEDBACK BASED ENGINE CONTROL WITH VARIABLE RESOLUTION SAMPLING WINDOWS

CLAIM OF PRIORITY

This application claims priority under 35 USC § 120, and is a Divisional application to U.S. patent application Ser. No. 15/099,486 filed Apr. 14, 2016; which claims priority under 35 USC § 119(e) to U.S. Patent Application Ser. No. 62/147,405, filed on Apr. 14, 2015, both of which and the entire contents of thereof are hereby incorporated by reference.

BACKGROUND

Combustion monitoring via cylinder pressure is used to develop engine combustion strategies and their control on nearly all engines in the research and development environment. However, cylinder pressure based monitoring systems on production engines remain short on capability, and are expensive and unreliable, thus limiting their applicability to only the highest power density and highest efficiency applications where their benefits can be justified against their cost.

DESCRIPTION OF DRAWINGS

FIG. 5 is a graph of pressure vs. crank angle for a cylinder showing three pressure sampling rate windows.

Like reference symbols in the various drawings indicate like elements.

DETAILED DESCRIPTION

Figure 1:
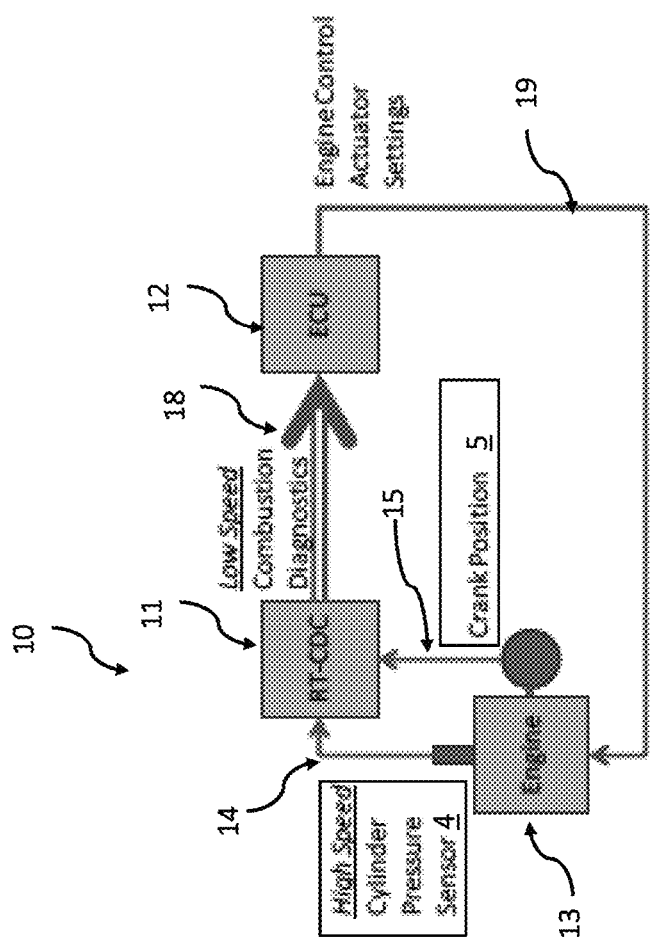
FIG. 1 is a schematic of the engine control system.

The concepts herein encompass controlling an engine using high-frequency in-cylinder pressure measurements processed by an engine control unit (ECU) at varying sampling rates, wherein the sampling rate is based on where the cylinder is in the combustion cycle. The concepts disclosed herein provide an ability to operate based on in-cylinder pressure measurements without the need for a high power processor, and in certain instances, without requiring a separate higher power ECU for processing the pressure signals to combustion metrics that resides apart from the ECU for determining and controlling the ignition timing and fueling. The variable sampling rates can reduce memory and computation demand on the ECU by reducing the rate of calculation of combustion metrics during less operationally significant regions of engine operation. Using in-cylinder pressure measurements can eliminate the need for using multiple other sensors for engine control, for example, eliminating the need for a mass-air-flow sensor, NOx (oxides of nitrogen) sensor, knock sensor or exhaust temperature sensor. Moreover, in certain instances, the concepts herein enable better adapting to variations in fuel quality (e.g., variations in methane number (MN) and energy content (MBTU/m³)).

The engine control unit (ECU) has an embedded processor with, in certain instances, the capability to process high-speed cylinder pressure data with resolution as fine as 0.25° crank and capable of producing a comprehensive suite of diagnostics for monitoring combustion, as well as, filtering and averaging the combustion diagnostics in real-time, i.e., concurrent with the engine operation and current enough for use in a control loop for controlling the engine. In some instances, the ECU is capable of processing up to 20 cylinders in real-time with the total processing time for each cylinder of around 2.5 milliseconds. The real-time combustion metrics calculated by the ECU can include location, in crank angle or time, of peak pressure ($P_{loc}$) and maximum pressure ($P_{max}$) within one or more the cylinders. Additionally, in certain instances, the ECU can calculate, on a cylinder-by-cylinder basis, the adiabatic heat release rate of the per cycle combustion, the locations, in crank angle or time, of 10%, 50%, 90% of the per cycle combustion (CA10, CA50 (AKA Center of Combustion (CoC)), and CA90) and the duration of 10-90% of per cycle combustion, as well as other combustion diagnostics metrics derived from the pressure signal, such as IMEP (indicated mean effective pressure, polytropic coefficients (K, indicative of compression quality of the cylinder), combustion stability (COV of IMEP).

Examples of the embedded pressure monitoring system can be found in closed-loop control on a modern four-cylinder, reciprocating diesel engine, in both a conventional dual-fuel natural gas-diesel mode, and a Reactive Controlled Compression Ignition, or RCCI, gas-diesel mode—in a research lab environment. However, the concepts are not limited and are applicable to any other engine configurations such with fewer or more cylinders, different fuel types, and to other, non-reciprocating types of engines. And concepts disclosed herein go beyond the research lab environment to be made practical in an embedded ECU.

For a gas-diesel dual-fuel operation, control to a constant CA50 (crank angle at 50% of combustion heat release) is demonstrated for a varying set point as well as for rejection of external disturbances, such as EGR and fuel injection pressure. For RCCI mode, closed-loop control of CA50 is demonstrated.

In some instances, the concepts herein encompass natural gas engines that employ cylinder pressure monitoring to determine the IMEP and center of combustion (CA50) as primary methods based upon new capabilities, such as heat release, herein disclosed, while also being able to monitor and control on more conventional pressure only methods such as the magnitude and location of peak pressure and adjust spark and fueling to balance the cylinders, while safely keeping the peak pressure below the engine design limits. According to the concepts herein, in some diesel engines, ignition delay can be monitored to enable real-time injector re-calibration. According to the concepts herein, in some natural gas-diesel dual-fuel engines, a pressure monitoring system enables the substitution rate of gas-to-diesel to be maximized by monitoring combustion phasing and knock, and then compensating with gas injection rates and diesel injection timing to maintain maximum substitution rates without knock.

For Homogeneous Charge Compression Ignition (HCCI), Premixed Charge Compression Ignition (PCCI), and RCCI and other low temperature combustion (LTC) modes, combustion feedback can be used to maintain key combustion parameters within specified limits. Combustion parameters such as location of start of combustion (SOC), center of combustion (CA50), the rate of pressure rise (RPR), and maintaining $P_{max}$ below the engine limit are provided to the controller.

Conventional methods which exist prior to this innovation include ECU system uses cylinder pressure monitoring fed directly into a controller and using the pressure ratio method, such that the ECU then adapts spark-timing control and dilution control, to balance cylinders and conduct misfire and knock detection. The innovation departs from the conventional method by processing the pressure trace and converting it into multiple useful combustion metrics way beyond Peak Pressure only methods, by the high speed processor using efficient vectoring and the algorithms which provide flexibility to wrap controls and diagnostics around the metrics, in contrast to the conventional method which only uses the voltage of the pressure sensor directly into a "one kind of control" controller.

The conventional ECU system, in some instances, due to memory and processor limitations, analysis of the pressure trace can be limited to information customized to work directly with the engine control strategy and the processor for determining the combustion metrics is embedded in the same device as the remainder of the engine control unit. In a memory or processor limited implementation, the conventional ECU system selects only a small subset of the combustion metrics and uses surrogate analyses that are useful only for a one of a kind pre-designed engine control objective; they are not general.

One of the objectives of the ECU system is to convert high-speed cylinder pressure data into meaningful low speed data that can inform the user of the engine operating conditions within a small number of engine cycles—especially during calibration—and provide stable and reliable smart sensor input to the ECU to deliver the following benefits. In some instances, the ECU system enables engine protection via appropriate actuator changes to provide overpressure protection ($P_{max}$), pressure rise rate protection (RPR), knock detection, and misfire detection. In some instances, the ECU system calculates combustion metrics in order to determine the above actuator changes (e.g. spark timing, in-cylinder injection and port injection timing and duration, AFR control, and throttle position. In some instances, the calculated combustion metrics are optimal $P_{loc}$, optimal CA50, resulting RHR, start of combustion (SOC), and indicated mean effective pressure (IMEP) cylinder balancing.

In some instances, the system is built into an embedded controller that communicates with the main controller directly or over a controller area network (CAN) link, and without significant time lag. Alternatively, in some instances, the method is performed directly on the main processor of the ECU, assuming adequate computational power is available.

In some instances, the engine control device is configured to improve knock margin in gas engines, improve maximum gas-to-diesel substitution rates in a gas diesel dual-fuel application, and enable precise control of combustion phasing of an LTC strategy such as HCCI, RCCI, PCCI, all within the engine protection limits.

FIG. 1 is a schematic of the engine control system. FIG. 1 shows a schematic of the ECU 11 within the engine control system 10 configured to control an engine 13. As indicated above, high-speed pressure data 14 is generated by pressure sensors 4, each mounted with direct access to the combustion chamber. The pressure signal 14 is captured at a high crank-synchronous rate—as fine as 0.25° resolution or 2880 samples per engine cycle. This synthetic crank angle signal is generated from the lower resolution crank position signal. For example, with a typical crank angle encoder 5 generating a crank angle signal 15 by sensing passage of the edge of teeth on a disk, the disk mounted to rotate with the crank, the resolution of the crank position is based on the number of teeth. A typical 60-2 tooth wheel has a resolution of 6°. However, interpolation can used to determine the crank angle in the space between of the edges. Thus, the spacing between edges uses the previously observed tooth period divided by the number of edges required to achieve the desired angular sampling resolution. To account for minor variability between the crank teeth that can be seen even when the average engine speed is constant, and the encoder system is re-synchronized on each edge.

The resulting high-resolution pressure signal 14 is used by the combustion diagnostics routine in the ECU 11 to produce the key combustion diagnostics 19 on a per-cylinder, per cycle basis, for example, IMEP, $P_{max}$, CA50. The metrics 18 are subsequently used by the ECU 11 as a feedback signal for adjusting key combustion performance characteristics by modulating engine control actuator settings 19.

In conventional (non-LTC) dual-fuel operation, combustion phasing is a critical factor for efficiency, emissions, and knock margin. Good control of combustion phasing can significantly improve the maximum gas substitution rate. As not all variables in the engine can be held to tight tolerances (including manifold absolute temperature (MAT), manifold absolute pressure (MAP), and diesel injection rail pressure for example), typical open-loop methods of controlling combustion phasing can be significantly enhanced by some feedback mechanism.

Reactivity Controlled Compression Ignition (RCCI) is a one of many LTC strategies to dramatically reduce NOx production and simultaneously achieve fast combustion of lean mixtures to improving efficiency. In RCCI, two fuels of different reactivity are introduced early into the combustion chamber to adjust the phasing of combustion initiation and rate of combustion. In gas-diesel RCCI, natural gas is injected into the intake port and diesel is injected directly into the combustion chamber. With diesel common rail, it is possible to inject the diesel portion at various times and quantities up to the limitations of the injection system. Typically, the diesel is injected much earlier than normal diesel or gas-diesel dual-fuel as early as just after intake valve closing (IVC) to as late as 70° before top dead center (BTDC, where TDC is the crank position at which the piston is in its top most position within the cylinder). Additionally, the 'gain' switches sign, where in RCCI, earlier diesel timing leads to later combustion phasing—which is the opposite of diesel and dual-fuel combustion where earlier diesel leads to earlier combustion phasing.

Figure 2:
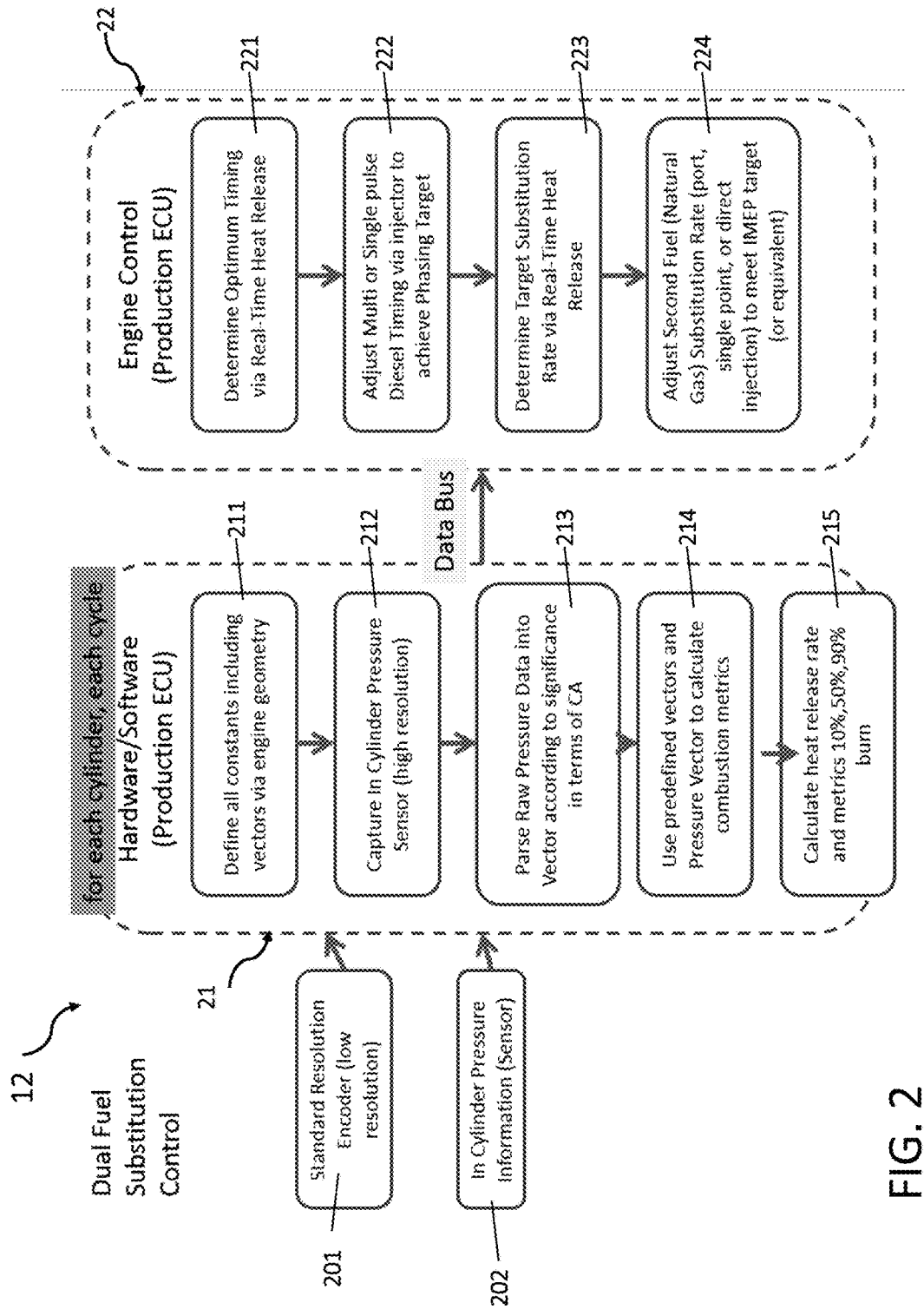
FIG. 2 is a schematic flow diagram of the operation of the system.

FIG. 2 shows an example flow diagram of the internal operation of the ECU 12 of system 10. While shown as separate ECU coupled with a data bus, in other instances, the ECU 12 can be a single ECU with a common processor or separate processors for the combustion metric determination and the engine control. FIG. 2 shows the ECU 12 accepting inputs from a crank angle sensor 201 and an in-cylinder pressure sensor 202. The crank angle sensor 201 need not be a high resolution sensor, and in certain instances, it can be a sensor reading a 60-2 tooth wheel. For each cylinder, the ECU 12 calculates combustion metrics from the input data 201, 201. In the ECU 12, for each cylinder, the following steps are executed in a pressure sensor processing module 21. First, at step 211, all constants are defined, including vectors via engine geometry. Next, at step 212, the in-cylinder pressure is captured, in some instances, at a specified sampling rate defined by a sampling rate window. Next, at step 213, the raw pressure data is parsed into vectors according to the corresponding crank angle. Next, at step 214, combustion metrics are calculated using predefined vectors and the pressure vector. Finally, at step 215, the heat release rate and combustion durations (i.e., 10%, 50%, and 90% burn) are calculated.

Figure 4:
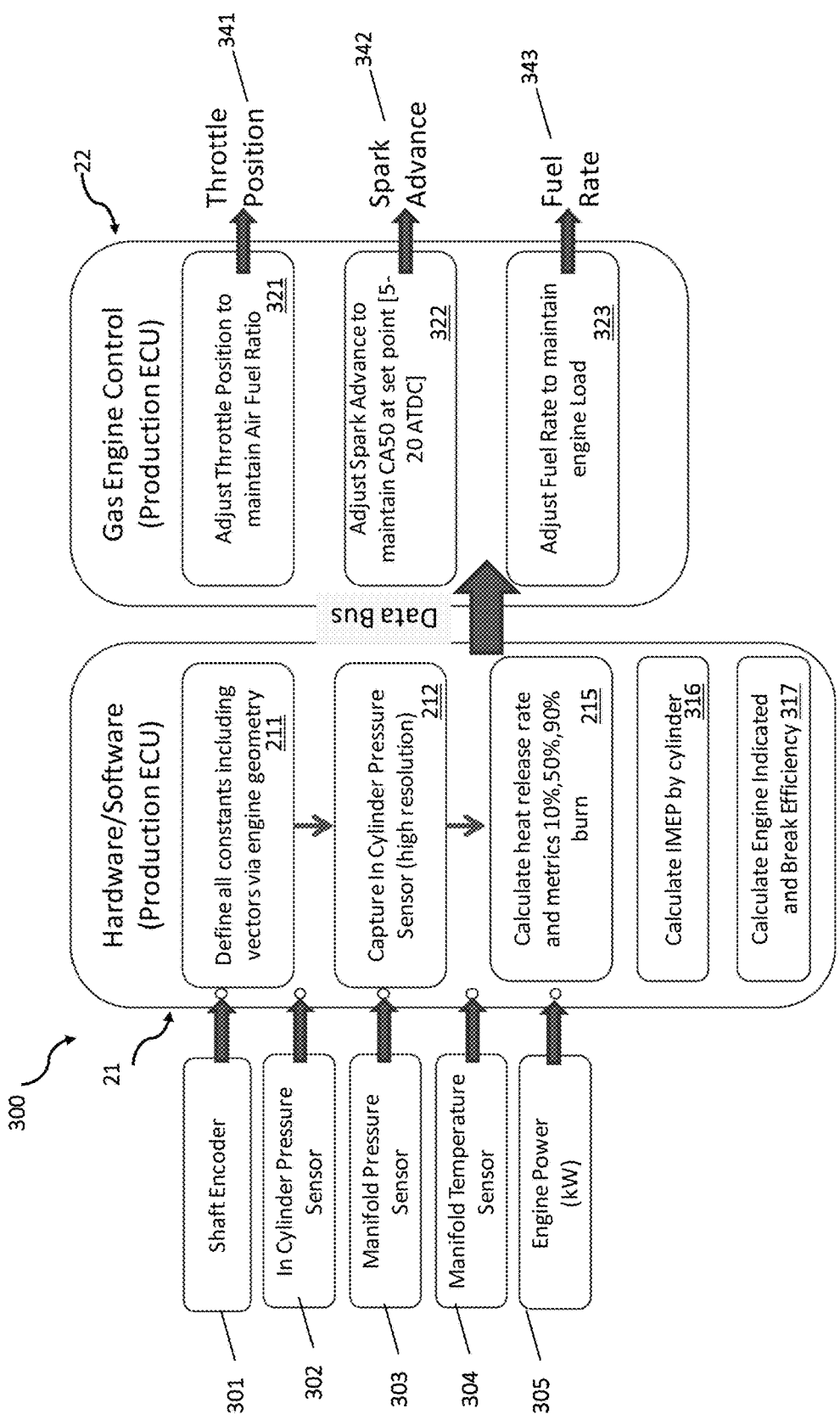
FIG. 4 is a schematic of the internal processing steps of the engine control unit of FIG. 3.

The results of the per-cylinder combustion metrics are fed to the engine control module 22 of the ECU 12, where the following steps are executed. The engine control module 22 of FIG. 2 shows the manner of using real-time heat release calculations to operate a dual-fuel engine to meet an IMEP, or similar, target. (FIG. 4 shows a similar embodiment for a single fuel gas engine—spark timing, throttle setting and fuel rate). First, at step 221, the optimum engine timing are determined via the real-time heat release calculated at step 815. Next, at step 222, the multi or single pulse diesel timing are adjusted by the injector to achieve a phasing target. Next, at step 223, a target substitution rate is determined via the real-time heat release calculated at step 215. Finally, at step 224, the ECU 12 adjusts engine control parameters to meet a set point. For example, an IMEP target or the equivalent. In some instances, at step 224, ECU 12 meets the set point by adjusting a set fuel substitution rate.

In some instances, high resolution triggering (up to 0.250 CA resolution) is provided from a low resolution encoder (e.g., a sensor reading a 60-2 tooth wheel), by using linear interpolation.

Optionally, and as discussed in more detail below, the ECU 12 can employ a high efficiency processing method that enables processing of over 15 combustion metrics per each cylinder for each cycle, while being fit in a standard "automotive" production ECU (with maximum allowable processor and memory). In particular, the vector of pressure readings from the cylinder pressure sensor is sampled at different resolutions based on where the cylinder is in the combustion cycle. Thus, the vector is sampled at the highest resolution during only the most critical times, and the total amount of data processed is reduced. Also, the data is collected and processed from the same memory for all cylinders.

In some instances, simultaneous control of a combustion phasing metric, for example centroid of heat release (CA50, a metric derived from high speed processing of heat release rate for every cycle), is conducted with actuation of combustion triggering phasing (e.g., spark advance or diesel start of injection) concurrently with simultaneous control of a combustion energy metric (e.g., IMEP). This simultaneous control is achieved though actuation of total fuel quantity, either in-cylinder, in a diesel configuration, or extra-cylinder in, for example, in-port injection of natural gas or gasoline.

In some instances, and as described in more detail below, a dual fuel maximum substitution rate is calculated based on ratios of various heat release rate metrics, such as CA10, CA50, CA90, where all three metrics CA10, CA50 and CA90 are subsequently used to control the quantity of fuel (fuel profile), and CA50, specifically, is used in controlling the phasing, i.e., the start of injection. Further CA10 can be used to as a surrogate control metric for start of combustion.

In some instances, real time processing of derived compression and expansion polytropic coefficients from the pressure signals are used for high quality heat release rate calculations. The heat release rate calculations include diagnostics of compression curve quality via calculation of "motored" pressure curve. The heat release rate can diagnose changes in cylinder and pressure sensor quality via deviations from the expected compression curve. In some instances, the polytropic constants are recorded over time to determine a rate of drift of pressure sensor or cylinder compressive quality due to ring and/or valve tightness.

In some instances, the system is configured to switch immediately and seamlessly from conventional diesel only to (i) "dual fuel" mode, whereby combustion starts shortly after trigger injection near TDC, or (ii) to "RCCI" mode, including early injection of a trigging medium while maintaining both combustion phasing (e.g. SOC, CA50, Loc-Peak) and total combustion energy (IMEP) metrics.

In some instances, a pressure based knock index is calculated using real-time pressure trace smoothing and integrated, weighted, ripple calculations. The knock index is fed to the control ECU for either maximum substitution or maximum spark advance limitations. Using the knock index, the system maintains operation on the edge of knock. In some instances, the system monitors knock index and adjusts both air fuel ratio (AFR, Lambda) and spark timing for maximum efficiency at a given NOx level. Can also include NOx sensor input. In some instances, the system uses the knock index to conduct real-time knock margin control by advancing the combustion phasing control variable (e.g. spark timing) to a point where the knock intensity reaches a pre-set target value and then the phasing control records this phasing angle, and the system then retards the timing to a preset 'retard from knock' value, thereby providing a best knock margin and efficiency balance. In some instances, the system performs a statistical sample of the variation of the combustion phasing target relevant to the actual. A voting function subsequently checks the need to adjust spark timing, and, if the knock margin, misfire, and efficiency meet goals, then a discrete change in spark timing is executed. Once the change is made, the value is held constant until another legitimized change is affected.

In some instances, the system calculates individual peak pressure error from the mean peak pressure magnitude to achieve a cylinder injected energy balance by subsequently adding or subtracting energy for cylinders below or above the average, respectively.

In some instances, a rate of pressure rise is calculated. The magnitude of the pressure and the rate of pressure rise are used to limit fuel energy injection content or combustion phasing. In some instances, in dual fuel engines, rate of pressure rise is used as a final protection, while the rate of heat release used as the primary control parameter. In RCCI, combustion phasing is first controlled via diesel injection timing and then rate of pressure rise is the key protection and control parameter to control the ratio of the two fuels.

In some instances, the system computes combustion stability (COV of IMEP) and uses this stability calculation to determine a lean misfire air-fuel-ratio. Once lean misfire AFR is known, air fuel ratio controller is set to keep charge richer than misfire limit by a given margin and combustion phasing control is used to maintain best efficiency or input a NOx signal to retard timing to maintain NOx below its limit.

In some instances, the system performs real-time calculation of fuel quality via real-time IMEP calculation. The IMEP is divided by injected fuel mass quantity to calculate fuel specific energy content, Q. In some instances, the calculation requires CA50 control to avoid confusion of energy and phasing. Once fuel quality is known, appropriate AFR and combustion phasing control is executed.

In some instances, the system adapts to changing gas quality during engine operation, without the need for a gas quality sensor, by using the combustion feedback instead.

Pressure Based Fuel Flex Gas Engine Controller

Typical gas engines today, for example natural gas engines, are operated with fixed spark timing along with an in-factory calibration for AFR. This typical configuration may provide a good knock margin and meet emissions norms on a firing engine put into operation. However, for some engines, the spark timing and AFR are set such that the center of combustion or CA50 (time of 50% fuel burn) are maintained in a relatively retarded location between 15° and 20° ATDC. These settings are considered conservative and are set such that the worst envisioned fuel gas quality would not lead to engine damaging knock. In this type of calibration, a provided knock sensor is utilized only in extreme conditions; otherwise, the knock signature is relatively low. The result of this configuration is that while meeting NOx emissions norms, engines running with 'good fuel' (i.e., having low knock tendency by virtue of a high methane number (MN)) are running with a less-than-optimal fuel consumption during most or all of the time they are in operation. This loss of potential fuel economy can be, for example, as high as 1-4%.

In contrast, some engines use a more aggressive strategy wherein the knock sensor is used more intentionally for combustion phasing control. The assumption is that advancing combustion phasing to the point of light knock gives the best fuel efficiency. This is especially true with J-gap spark plugs, which have high cycle-to-cycle variation. In these systems, if the fuel quality changes with a drop in MN, there is time for the knock to register in the controller and appropriate spark timing or AFR lean can be achieved to accommodate. This strategy depends upon the knock sensor working. Additionally, when going to better ignition methods such as prechamber spark plugs and fuel fed prechambers, where the cycle to cycle variation is smaller and the combustion rate faster, that the condition of "light knock" would be overly advanced combustion and would be less efficient.

Additionally, there is no method in the aforementioned two configurations to keep cylinder pressure below the mechanical limits or keep the rate of pressure rise rate below the mechanical limit. Additionally, when fuel quality or AFR goes in the opposite direction, that is, leading toward poor combustion and misfire, typically the only method of detection on existing engines is by monitoring cylinder exhaust port temperatures. However, this leads to an ambiguous monitored condition, as high temperatures indicated late combustion while very low temperatures indicate misfire. Misfire is also indicated by instantaneous shaft speed variations, which can be used to corroborate a low temperature reading as a diagnostic of misfire.

One problem with the above systems is maintaining the engine between the knock limit and the misfire lift while maintain the NOx norms and achieving highest efficiency, especially when fuel quality changes and when the atmospheric conditions change. This problem is especially challenging when NOx norms are for very low NOx such as 1 TaLuft as low as 0.5 or 0.25 or even 0.1 TaLuft where air. The systems detailed below address the problem by using real-time in-cylinder combustion metrics to adjust both the combustion phasing and the burn duration to remain optimal under the influence of changes in fuel and atmospheric conditions.

Figure 3:
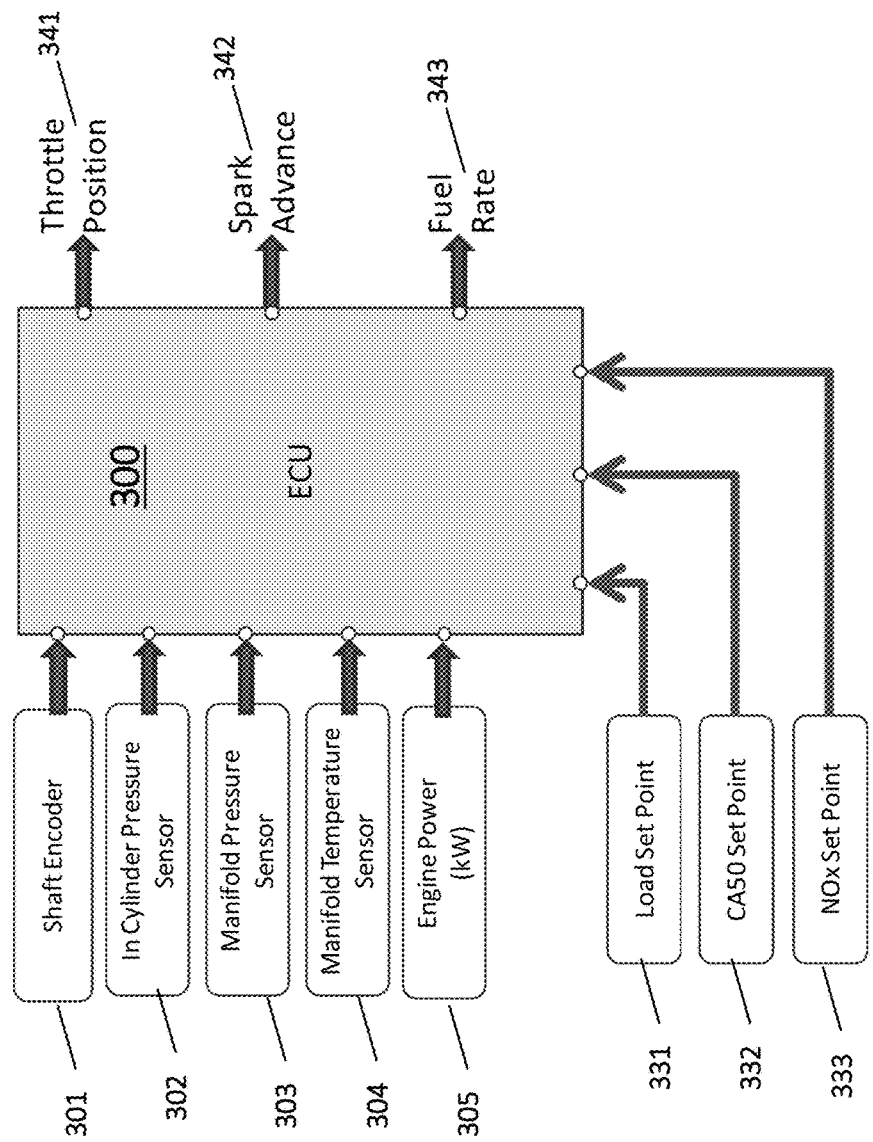
FIG. 3 is a schematic of an engine control unit showing inputs, outputs, and set points.

FIG. 3 is a schematic of an engine control unit 300 showing inputs 301 to 305, outputs 341 to 343, and set points 331 to 333. The ECU 300 could be the same ECU 12 as shown in FIGS. 1 and 2, or it could another embodiment. The ECU 300 inputs data from a shaft encoder 301 (e.g., a crank angle sensor), an in-cylinder pressure sensor 302, a manifold pressure sensor 303, a manifold temperature sensor 304, and an engine power sensor 305. The ECU 300 also accepts a load set point 331, a CA50 set point 332, and a NOx set point 333. The ECU 300 controls the engine (not shown) by outputting one or more of a throttle position signal 342, a spark advance signal 342, and a fuel rate signal 334.

FIG. 4 is a schematic of the internal processing steps 311-5, 321-3 of the engine control unit 300 of FIG. 3. The ECU 300, for each cylinder executes the following steps. First, in the pressure processing module 21, at step 211, all constants, including vectors via engine geometry, are defined. Next, at step 212, the in-cylinder pressure is captured at a high resolution. In some instances, the pressure sensor is captured at a first (high) frequency during critical crank angles or combustion events, and at a second (lower) or third (medium) frequency at non-critical crank angles or combustion events. This pressure sampling window, shown in more detail in FIG. 5, enables the ECU to more efficiently using existing memory and processing bandwidth to prioritize the subsequent calculations to capture the critical combustion events. The per-cylinder pressure step 215, the heat release rates and burn metrics are calculated. The pressure processing module 21 can calculate the IMEP at step 316, and the engine indicated efficient and brake efficiency can be calculated at step 317.

Finally, the engine control module 22 of the ECU 300 is configured with a first module 321 adjusting the throttle position 341 to maintain an air fuel ratio 321, a second module 322 adjusting a spark advance 342 to maintain CA50 at the CA50 set point 332, and a third module 323 adjusting the fuel rate 323 to maintain the engine load at the engine load set point 331.

Referring to FIG. 3 and FIG. 4, by taking directly into the ECU 300 the engine power 305, MAP 303, and MAT 304, shaft encoder 301 and cylinder pressure 302 signals for each cylinder directly, and processing them at steps 311-313 to determine internally key combustion metrics such as CA50 (center of combustion), 10-90% burn duration, and IMEP, the system uses calibrated values for these metrics and then determines and adjusts the proper spark advance 342, throttle position 341, and fuel flow rate to maintain engine power and NOx emissions targets, and best operating point efficiency while protecting the engine from knock, misfire, and over pressure—without any of the following sensors: knock sensors, lambda/O2 sensor, exhaust port temperature sensors.

Aspects represent a significant improvement, because by using pressure sensors instead of knock, lambda, and exhaust temp sensors, engine protection is improved, sensor count goes down, NOx compliance is improved (especially at low NOx points), and efficiency is maximized. The improvements are possible due to the ECU having built in cylinder pressures processing and ability to generate in real time combustion metrics such as heat release rate and the offshoots of these CA50 and 10-90 burn duration.

Variable Pressure Sampling Windows

FIG. 5 is a graph 500 of pressure vs. crank angle for a cylinder showing three pressure sampling rate windows 501a,b,c. The sampling rate windows 501a,b,c represent regions where the ECU samples the pressure sensor 302 at different sampling rates corresponding to the combustion events taking placing in the windows 501a,b,c. In FIG. 5, a pressure traces 502, 503 are shown for a complete combustion event in a cylinder, e.g., 720° total, with 0° representing top-dead-center. Pressure trace 502 represents a pressure rise from combustion in the cylinder over and above the trace 503, which represents the pressure from compression via the piston. The pressures trace 502 represents the raw in-cylinder pressure sensor 302 output. The graph 500 is divided into five windows 501a through 501c during which the pressure sensor is sampled at different rates by the ECU 300. A first sampling window 501a represents the pressures of least concern to the ECU 300 for efficiently controlling the engine, as there is not much, operationally speaking, occurring in these windows. Thus, the pressure may be sampled at the lowest rate in this window. In certain instances, the sampling rate is 2 to 8 crank angle degrees per sample (i.e., one pressure sample every 2 to 8 degrees rotation of the crank). The first window 501a spans the crank angles 180° before and 180° after top-dead-center, but in other instances, could span fewer or more crank angles. Likewise, a higher or lower sampling rate could be employed in the first window.

A second sampling window 501b spans the crank angles+/−180° to +/−60° with respect to top-dead-center. The pressure signals in the second window 501b represent pressures of intermediate concern to the ECU 300 in operation of the engine, as the pressure change in these windows is more operationally significant. Thus, the pressure 502 in the second window 501b may be sampled at a higher rate than during the first window 501a. In certain instances, the sampling rate in the second window is 1 to 6 crank angle degrees per sample. As above, the second windows 501b could span fewer or more crank angle degrees, and higher or lower sampling rates than 1 to 6 crank angle degrees per sample could be employed.

Finally, a third window 501c spans the remainder (180° in this example) and is centered on the top-dead-center position of the piston and represents the location of pressure signal locations critical to the ECU's 300 calculations of combustion metrics 313 and subsequent control 341-3 of the engine. In addition to the third window 501c encompassing TDC, the window is also when the ignition event occurs (e.g., spark event in a spark fired engine). Accordingly, the pressure 502 is sampled in the third window 501c at the highest rates, higher than in the first or second windows. In certain instances, the sampling rate in the third window is 0.25 to 0.5 degrees per sample (i.e., 2 to 4 samples per crank angle). Again, as above, the third window could span few or more crank angles and the sampling rate could be higher or lower than the example.

In some instances, the span of windows 501a to 501c are selected based on the combustion conditions and the engine cycle, and may be, for example represent pressure sampling rates variably determined by the ECU during operation of the engine.

In some instances, fewer or more than three pressure sampling windows 501a,b,c are used, and, in some instances, the windows 501a,b,c are selected based on computer models of the combustion and subsequently verified with physical tests.

The ECU's 300 use of pressure sampling windows 501a,b,c enables the ECU to allocate memory and computation resources to calculating the combustion metrics during the pressure signal locations of highest importance to the effective control of the engine based. Specifically, in some instances, the ECU 300 operates the pressure sampling widows 501a,b,c at a sampling level, that is, the ECU only captures data from the pressure sensor 302 at the rates determined by the window 501a,b,c, thereby further saving resources by not having to drop captured data in order to comply with parameters of the sampling windows 501a,b,c.

In some instances, the pressure sampling rate in the windows 501a,b,c is variable and the windows represent a rate-change of the pressure sampling rate.

Acronyms/Abbreviations

ATDC=after top dead center
BTDC=before top dead center
CA50=location of 50% mass fraction burn (crank angle degrees ATDC)
CAN=controller area network
COV=coefficient of variation
ECU=engine control unit
EGR=exhaust gas recirculation
HCCI=homogeneous charge compression ignition
IMEP=indicated mean effective pressure (bar)
IVC=intake valve closing angle
LTC=low temperature combustion
MAP=manifold absolute pressure (bar)
MAT=manifold absolute temperature (K)
NOx=oxides of nitrogen
PCCI=premixed charge compression ignition
Ploc=location of peak pressure (crank angle degrees ATDC)
Pmax=maximum cylinder pressure (bar)
R&D=research and development
RCCI=reactivity controlled compression ignition
RPR=rate of pressure rise (bar/crank angle degree)
RT-CDC=real-time combustion diagnostics and control
SOC=start of combustion (crank angle degrees ATDC)

An example apparatus for controlling operation of an internal combustion engine includes an in-cylinder pressure sensor configured to measure pressure in a cylinder of the engine and generate a corresponding pressure signal, a crank angle sensor configured to measure the crank angle of the engine and generate a corresponding crank angle signal and an engine control unit capable to couple the pressure sensor and the crank angle sensor. The engine control unit is configured to: (a) sample the pressure signal and the crank angle signal at a specified frequency, the specified frequency in a first range of the crank angle that includes a piston top-dead-center being greater than the specified frequency in a second range of the crank angle, (b) calculate a combustion metric indicative of the combustion occurring in the cylinder as a function of the pressure signal and the crank angle signal, and (c) determine fuel input signal, throttle position signal, and an ignition timing signal for the engine based on the combustion metric.

In some examples, the specified frequency in the first range is between 0.25° and 0.50° crank angle per sample.

In some examples, the second range includes the bottom-dead-center position, and wherein the specified frequency in the second range is between 2.0° and 8.0° crank angle per sample.

In some examples, the apparatus further includes a third range between the first and second ranges, and wherein the specified frequency in the third range is between 1.0° and 6.0° crank angle per sample.

In some examples, the first range coincides with the crank angle of the ignition timing signal.

In some examples, combustion metric comprises at least one of an adiabatic heat release rate of combustion in the cylinder, a maximum pressure in the cylinder, the crank angle location of the maximum pressure in the cylinder, a crank angle location of each of the 10%, 50% and 90% combustion (i.e., burn) conditions, a 10%-90% combustion duration, or indicated mean effective pressure (IMEP) for each cylinder.

In some examples, ECU receives one or more of the following set points: engine load set point, CA50 set points, and NOx set point, and wherein the ECU is further configured to determine the throttle position signal as a function of the combustion metric and one of the set points, determine the ignition timing signal as a function of the combustion metric and one of the set points, and determine the fuel input signal as a function of the combustion metric and one of the set points.

Another example is a method of controlling an internal combustion engine. The method comprises, sampling a crank angle sensor of the engine. Sampling a pressure sensor of each cylinder of the engine at a first frequency during a first range of cylinder crank angles, the first range of cylinder crank angles including the ignition position of the cylinder. Sampling the pressure sensor at a second frequency during a second range of cylinder crank angles, the second frequency being lower than the first frequency. Calculating a combustion metric based on the sampled crank angle and pressure. Determining an engine control parameter, the engine parameter including at least one of an engine throttle position, spark advance, and fuel-air ration based on the calculated combustion metric. Controlling the engine based on the engine control parameter.

In some examples, first frequency is between 0.25° and 0.50° of the crank angle per sample of the pressure sensor.

In some examples, the second frequency is between 2.0° and 8.0° of the crank angle per sample of the pressure sensor.

In some examples, the method further includes sampling the pressure sensor at a third frequency during a third range of cylinder crank angles, the third frequency being between the first and second frequencies and the third range being between the first and second ranges.

In some examples, the third frequency is between 1.0° and 6.0° of the crank angle per sample of the pressure signal.

In some examples, the method further includes modifying the first range based on the sampled pressure.

In some examples, the method further includes modifying the first range based on the calculated combustion metric.

In some examples, determining the engine control parameter is based on one or more combustion metrics, where the one or more combustion metrics are calculated from only the pressure and crank angle sensors as sensor inputs.

In some examples, the combustion metric includes one or more of the following: an adiabatic heat release rate of combustion in the cylinder, a maximum pressure in the cylinder, the crank angle location of the maximum pressure in the cylinder, a crank angle location of each of the 10%, 50% and 90% burn conditions, a 10%90% combustion duration, or indicated mean effective pressure (IMEP) for each cylinder.

In some examples, the method further includes receiving one or more of the following set points: engine load set point, CA50 set points, and NOx set point, determining the throttle position signal as a function of the combustion metric and one of the set points, determining the ignition timing signal as a function of the combustion metric and one of the set points, and determining the fuel input signal as a function of the combustion metric and one of the set points.

In some examples, the method further includes determining a knock quality of a cylinder combustion event based on the combustion metric.

In some examples, the engine is a dual fuel engine, the method further includes determining a maximum safe substitution rate between a first fuel and a second fuel, and controlling fuel substitution rate between the first fuel and the second fuel based on the maximum safe substitution rate.

In some examples, the method further includes controlling fuel substitution between the first fuel and the second fuel based on a CA50 set point.

Aspects can include one or more of the following:

In some examples, the method or apparatus includes monitoring engine cylinder pressure.

In some examples, the method or apparatus includes inputting an engine crank angle signal to an engine control unit.

In some examples, the method or apparatus includes combining cylinder pressure with engine crank angle and thus associate with the cylinder volume. In some examples, data is analyzed in time, and the data includes engine crank angle or engine cylinder volume.

In some examples, the method or apparatus analyzes the cylinder pressure signal against time, crank angle (CA), or cylinder volume.

In some examples, the method or apparatus includes calculating key combustion metrics. In some examples, the combustion metrics include IMEP, CA50, and 10-90% burn duration.

In some examples, the method or apparatus includes a means to control one or more of the following engine control parameters: spark advance, throttle position, and fuel flow rate. In some examples, the method or apparatus controls the above engine control parameters to achieve or maintain one or more of a load set point and a NOx set point, either of which may be controlled to achieve a best efficient at the set point. Additionally, in some examples, the method or apparatus controls the engine at the above set points without knock or misfire and within acceptable NOx outputs. In some examples, the method or apparatus is configured to control the engine at the above set points over a wide range of fuel quality, for example, MN, QLHV.

Generally, one skilled in the art will appreciate that the devices and methods described herein, in some configurations, eliminate need for MAF sensor, NOx sensor, Knock sensors, Port Ext Temp sensors. Additionally, the devices and methods described herein, in some configurations, avoid knock, detect and avoid misfire, maintain NOx within norms and achieve best engine efficiency. One skilled in the art will also appreciate that the devices and methods described herein adapt to variable fuel quality as characterized by MN (methane number) and Energy Content (MBTU/m$^3$).

A number of embodiments have been described. Nevertheless, it will be understood that various modifications may be made. Accordingly, other embodiments are within the scope of the following claims.

What is claimed is:

1. A controller for controlling operation of a dual-fuel internal combustion engine of an engine system, the engine system comprising a pressure sensor configured to measure pressure in a cylinder of the engine and generate a corresponding pressure signal and a crank angle sensor configured to measure the crank angle of the engine and generate a corresponding crank angle signal, the controller comprising:

a processor couplable to the pressure sensor and the crank angle sensor; and at least one non-transitory computer readable medium storing instructions operable to cause the processor of the controller to perform operations comprising:

(a) sample the crank angle signal, (b) sample the pressure signal of each cylinder of the engine at a first frequency during a first range of cylinder crank angles, the first range of cylinder crank angles including the ignition position of the cylinder and at least a portion of a combustion period of the cylinder, (c) sample the pressure signal at a second frequency during a second range of cylinder crank angles, the second frequency being lower than the first frequency, (d) calculate combustion metrics including indicated mean effective pressure (IMEP), an adiabatic heat release rate of combustion in the cylinder, and combustion phasing based on the sampled crank angle and pressure signals, (e) determine a combustion phasing trigger and a fuel substitution rate between a first fuel and a second fuel as a function of the calculated adiabatic heat release rate of combustion in the cylinder, (f) adjust the combustion phasing trigger based on the calculated combustion phasing to meet a combustion phasing target, (g) adjust the fuel substitution rate based on the calculated IMEP to meet an IMEP target, and (h) control the engine based on the adjusted combustion phasing trigger and fuel substitution rate.

2. The controller of claim 1, wherein the adiabatic heat release rate of combustion in the cylinder is calculated from only the pressure and crank angle sensors as sensor inputs.

3. The controller of claim 1, wherein the combustion metrics include one or more of the following:

the adiabatic heat release rate of combustion in the cylinder, a maximum pressure in the cylinder, the crank angle location of the maximum pressure in the cylinder, a crank angle location of each of the 10%, 50% and 90% burn conditions, a 10%-90% combustion duration, the IMEP for each cylinder, a rate of pressure rise, and a knock quality.

4. The controller of claim 1, wherein the instructions include causing the processor to:

determine a knock quality of a cylinder combustion event based on the calculated adiabatic heat release rate of combustion in the cylinder;

determining a maximum safe substitution rate as a function of the knock quality; and adjusting the fuel substitution rate based on the maximum safe substitution rate.

5. The controller of claim 1, wherein the instructions include causing the processor to simultaneously control the fuel substitution rate to meet the IMEP target and the combustion phasing trigger to meet the combustion phasing target by controlling a total fuel quantity.

6. The controller of claim 1, wherein the combustion phasing target is a CA50 set point and wherein controlling the engine includes controlling the engine to maintain the CA50 set point.

7. The controller of claim 1, wherein the instructions include causing the processor to maintain a maximum substitution rate by adjusting the fuel substitution rate based on the maximum safe substitution rate while adjusting the combustion phasing trigger to maintain a knock quality below target knock margin.

8. The controller of claim 1, wherein the instructions include causing the processor to modify the first range based on the sampled pressure.

9. The controller of claim 1, wherein the instructions include causing the processor to modify the first range based on the calculated combustion metrics.

10. The controller of claim 1, wherein the first frequency during the first range is between 0.25° and 0.50° crank angle per sample.

11. The controller of claim 1, wherein the second range includes the bottom-dead-center position, and wherein the second frequency during the second range is between 2.0° and 8.0° crank angle per sample.

12. The controller of claim 1, further including a third range between the first and second ranges, in which the pressure signal is sampled at a third frequency between 1.0° and 6.0° crank angle per sample.

13. The controller of claim 1, wherein the first range coincides with a crank angle of an ignition timing signal.

14. The controller of claim 1, wherein the combustion metrics comprise at least one of:

the adiabatic heat release rate of combustion in the cylinder, a maximum pressure in the cylinder, the crank angle location of the maximum pressure in the cylinder, a crank angle location of each of the 10%, 50% and 90% burn conditions, a 10%-90% combustion duration, or the IMEP for each cylinder.

15. The controller of claim 1, wherein the controller receives one or more of the following set points: engine load set point, CA50 set points, and NOx set point, and wherein the controller is further configured to:

determine a throttle position signal as a function of the combustion metrics and one of the set points, determine the ignition timing signal as a function of the combustion metrics and one of the set points, and determine a fuel input signal as a function of the combustion metrics and one of the set points.

* * * * *

UNITED STATES PATENT AND TRADEMARK OFFICE
CERTIFICATE OF CORRECTION

PATENT NO. : 10,458,346 B2
APPLICATION NO. : 15/968447
DATED : October 29, 2019
INVENTOR(S) : Jason Barta, Gregory James Hampson and Jeffrey Carlson Page 1 of 1

It is certified that error appears in the above-identified patent and that said Letters Patent is hereby corrected as shown below:

In the Specification

Column 5, Line 25, delete "0.250" and insert -- 0.25° --.

Signed and Sealed this
Seventh Day of April, 2020

Andrei Iancu
*Director of the United States Patent and Trademark Office*